US006950724B2

(12) United States Patent
Mileaf et al.

(10) Patent No.: US 6,950,724 B2
(45) Date of Patent: Sep. 27, 2005

(54) SYSTEM AND METHOD FOR DELIVERY POINT PACKAGING

(75) Inventors: Daryl Sunny Mileaf, Hanover, MD (US); Charles Stewart Shaw, Fairfax, VA (US); Stanley Katsuyoshi Wakamiya, Ellicott City, MD (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 10/697,033

(22) Filed: Oct. 31, 2003

(65) Prior Publication Data

US 2005/0096783 A1 May 5, 2005

(51) Int. Cl.[7] ........................... G06F 17/00; B07C 5/00; G06K 9/00

(52) U.S. Cl. ....................... 700/224; 700/226; 209/584; 209/900

(58) Field of Search ................................ 700/219, 220, 700/223, 224, 225, 226; 209/702, 703, 630, 900, 942, 584

(56) References Cited

U.S. PATENT DOCUMENTS

| | | | | | |
|---|---|---|---|---|---|
| 3,760,943 | A | * | 9/1973 | Reader | 209/546 |
| 4,593,816 | A | * | 6/1986 | Langenbeck | 206/425 |
| 6,386,381 | B2 | * | 5/2002 | Csiszar | 220/4.03 |
| 6,601,847 | B2 | * | 8/2003 | Hendrickson et al. | 271/302 |
| 6,715,614 | B2 | * | 4/2004 | Pippin et al. | 209/702 |
| 2002/0031284 | A1 | | 3/2002 | Pippin et al. | |

* cited by examiner

*Primary Examiner*—Gene O. Crawford
(74) *Attorney, Agent, or Firm*—Rothwell, Figg, Ernst & Manbeck

(57) ABSTRACT

The mail sorting systems and methods of the invention can be used to provide a mail carrier with a batch of mail that is arranged in delivery point order and separated by delivery point. Advantageously, the systems and methods employ an expandable, transportable container having a number of expandable compartments. Each expandable compartment holds the mail for a single delivery point.

26 Claims, 8 Drawing Sheets

SYSTEM AND METHOD FOR DELIVERY POINT PACKAGING

BACKGROUND OF THE INVENTION

1. Field of the Invention

The present invention relates to systems and methods for sorting mail.

2. Discussion of the Background

The United States Postal Service (USPS) allows large volume mailers of flat mail (i.e., mail that is generally flat shaped, but larger than typical letter-sized mail) to prepare a mailing in a number of formats and sequences. Typically, flat mail (or "flats") are prepared in bundles. Bundles are created to allow flats that are destined for the same carrier route or zone to be processed together.

There are a number of preparation schemes that mailers can use in preparing bundles of flats, and each scheme has a mailing cost associated with it. The following is an example of some of the various, schemes in which mailers can prepare bundles of flats. The first example scheme is referred to as "3-digit." In the 3-digit scheme, all mail within the bundle is addressed to a delivery point within a given 3-digit postal zone (this refers to the $1^{st}$ three digit of a zip code, i.e. 210xx). The mail within the bundle will be distributed to a number of facilities and carrier routes within that zone.

The second example scheme is referred to as "5-digit ." In the 5-digit scheme, all mail within the bundle is addressed to a 5-digit zone. The third example scheme is referred to as "carrier route". In the carrier route scheme, the bundle contains only mail for a specific carrier within a given 5-digit zone. The last example scheme is referred to as "Line-of-Travel (LOT) and/or Carrier Sequenced (CS)." In the LOT/CS scheme, the bundles have been prepared such that the mail within the bundles is in a sequence for a specific carrier within a zone. LOT mail contains mail in either ascending or descending order for addresses on streets in a close approximation of how the carrier actually delivers the mail. Carrier Sequence mail is prepared in exactly the sequence that the carrier delivers the mail.

Each above scheme is processed by the USPS differently and has an associated processing cost. 3-digit mail is usually cross-docked through postal facilities as a bundle until it arrives at the processing center that serves the 3-digit zone. The bundle is then opened and processed to a 5-digit level and delivered to the post office that serves that 5-digit zone.

5-digit bundles are cross-docked all the way to the processing center that serves the 5-digit zone. Depending on the processing center operations, the bundle may be delivered to the local post office that delivers the mail or may be processed down to the carrier level (separating the mail to the carrier within the deliver office so that the carrier doesn't have to separate the mail). Carrier Route, LOT and Carrier sequence mail are all cross-docked directly to the local post office that delivers the mail.

In all cases, the local carrier "cases" the flats for his route to prepare them for delivery. That is, as carriers receive their flats for the day, they sort them into what is referred to as "carrier walk sequence" or "delivery point order".

More specifically, casing a set of mail refers to the process of placing each piece of mail in the set into the appropriate cubbyhole in a matrix of cubbyholes. Each cubbyhole in the matrix corresponds to one delivery point on the carrier's route. Thus, by placing each piece of mail into its corresponding cubbyhole and then removing the mail from the cubbyholes in the order in which the carrier traverses his mail route, the carrier can create a bundle of mail that is in carrier walk sequence. Accordingly, the result of the casing operation is that all mail for each address or delivery point in the carrier's route is stacked together in order of delivery point. Thus, when the carrier arrives at a particular delivery point on his/her route, the carrier can simply remove from the "top" of his/her bundle of mail the mail addressed to the particular delivery point.

Various metrics are used to determine the rate at which mail can be cased. Mail presented to the carrier in carrier walk sequence can be cased much faster than purely random mail. Typically a carrier cases random mail at 8 pieces per minute and sequenced mail at 18 pieces per minute. In order to facilitate more productive casing operations, the USPS will pass a portion of the savings created by sequenced mail back to the mailers in incentives (i.e. mailers will be charged less per piece of mail if they prepare a sequenced mailing rather than a random mailing).

These mailing standards and incentives are based in a large part on the principle that the carrier will sequence (e.g., case) mail at the delivery unit and have been tailored to account for the automation and mechanization used in postal facilities to route the mail through the postal network.

In addition to the flats described above, other mail may be automatically processed and presented to the local carriers in the delivery order of their route (i.e., delivery point order). This process is referred to as delivery point sequencing. On many routes, a large portion of a carrier's letter mail can arrive at the delivery unit in this form. Letter mail that has not been delivery point sequenced ("residual mail") is cased along with the flats.

Carriers may also receive bulk mailings (high density and/or saturation mailings) that are to be delivered to a large percentage, if not all, of the delivery points on their route. These mailings are either presented to the carrier in delivery point order or do not have a specific address on them allowing the carrier to deliver them to the appropriate address without needing to check for the address on the mail piece (in these cases, the non-addressed mailing will be delivered along with an arrested card that serves as the carriers cue to include a high density piece of mail at that address). In other cases, all of the delivery points, or residences on the route receive one of the high-density pieces and no card is required.

After their in-office time, carriers load their vehicles and begin making deliveries on their routes. Usually, a carrier will have three bundles of mail that they take onto the street with them: (1) sequenced letters that were automatically prepared in processing centers, (2) cased letter and flats that they sorted in the delivery unit casing operation and (3) sequenced flats prepared by mailers. As the carriers arrive at each delivery point, they pull the appropriate mail from each bundle. This process is referred to as 'fingering the mail' as the carriers flip through the end of each bundle until they have accrued all of the mail for that delivery point in the bundle and then move to the next bundle. Carriers can, and do, facilitate this operation by folding their cased mail in a 'U' shape (using the flats mail to serve as a holder for the letter mail) when they pull it down from the cases. This allows a carrier to visually recognize a batch of mail for delivery point during the delivery process.

Recently, automation capabilities have been introduced into postal facilities that have enabled new and more efficient ways of handling the mail. More specifically, the use of high speed flats automation equipment and the development of automated sequencing equipment have enabled the USPS to consider moving the majority of delivery unit mail handling into the processing centers. In this new paradigm, mail would be processed to either carrier level, or completely sequenced at carrier level, before it arrives at the local delivery office. This approach would remove the majority of manual labor involved in preparing the mail for delivery and allow delivery offices to run more efficiently.

While these automated systems may reduce costs by reducing the labor involved with casing the mail, it is important that they do not increase costs elsewhere in the mail system. It is also important that they be environmentally friendly.

One such automated system is described in U.S. patent application Ser. No. 20030155282, filed on Feb. 15, 2002, the contents of which are incorporated herein by reference. However, the system described therein relies on environmentally unfriendly bundling machines. Other drawbacks and disadvantages also exist.

What is desired, therefore, is an economically efficient and environmentally friendly system and method for processing mail that reduces the manual labor involved with casing and delivering mail.

SUMMARY OF THE INVENTION

The present invention provides mail sorting systems and methods that overcome the disadvantages of conventional mail sorting systems and methods. The mail sorting systems and methods of the invention can be used to provide a mail carrier with a batch of mail that is arranged in delivery point order and separated by delivery point.

In one aspect, the present invention provides a method for sorting mail that includes the steps of using a mail sorting machine to create N groups of mail from a batch of mail input into the mail sorting machine, wherein each of the N groups of mail is for a different delivery point, providing a transportable container having N or more compartments, automatically placing each of the N groups into a compartment of the transportable container such that no two of the N groups are placed into the same compartment, and providing the transportable container to a mail carrier, wherein the mail carrier can carry the transportable container while delivering mail to delivery points on his/her mail route. Advantageously, the compartments of the transportable container are expandable and the transportable container is flexible.

In another aspect, the present invention provides a mail sorting system that includes a mail sorter that sorts mail, a plurality of temporary storage compartments, wherein each of the plurality of temporary storage compartments is coupled to the mail sorter so that it is able to receive and store mail that has been sorted by the mail sorter, and a transportable, expandable container having a plurality of expandable compartments, wherein each expandable compartment is associated with one of the plurality of temporary storage compartments such that no two of the expandable compartments is associated with the same temporary storage compartment.

The above and other features and advantages of the present invention, as well as the structure and operation of preferred embodiments of the present invention, are described in detail below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENT

Figure 1:
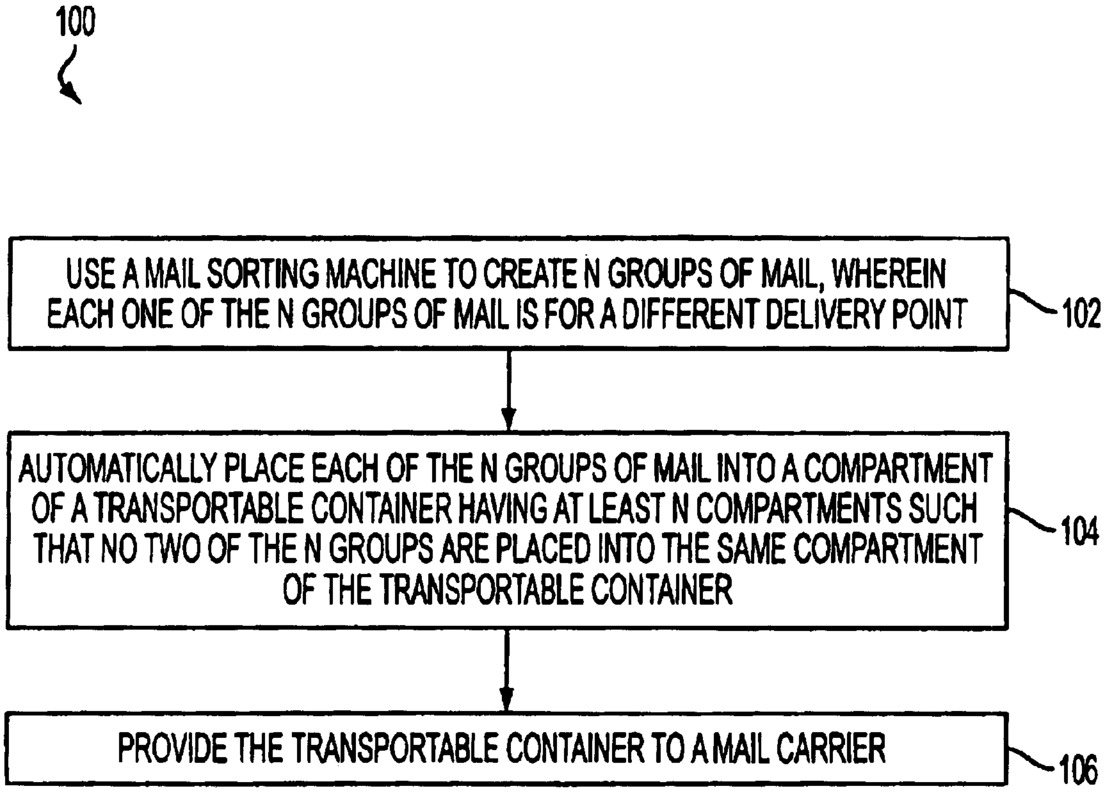
FIG. 1 is a flow chart illustrating a process according to an embodiment of the invention.

FIG. 1 is a flow chart illustrating a process 100 for providing a mail carrier with mail that is arranged in order of delivery point and separated by delivery point.

In step 102 a mail sorting machine is used to create N groups of mail (N>1), wherein each one of the N groups of mail should be delivered to a different delivery point. That is, all of the pieces of mail in the first group is addressed to a first delivery point, all of the pieces of mail in the second group is addressed to a second delivery point, . . . , and all of the pieces in the $N^{th}$ group of mail is addressed to the $N^{th}$ delivery point.

In step 104, each of the N groups of mail are automatically placed into a compartment of a transportable container having at least N compartments such that no two of the N groups are placed into the same compartment of the transportable container.

In step 106, the transportable container is provided to a mail carrier. The mail carrier can then carry the transportable container while delivering mail to the delivery points on his/her mail route. If the mail carrier has more than N delivery points on his route, then process 100 should be performed more than once.

Because each of the N groups of mail is for only one delivery point and each of the N groups of mail is placed into a separate compartment of the transportable container, the batch of mail provided to the mail carrier is separated by delivery point. Additionally, the mail can be arranged in order of delivery point by (1) placing into the first compartment of the transportable container the group of mail for the first delivery point on the carrier's route, (2) placing into the second compartment of the transportable container the group of mail for the second delivery point on the carrier's route, . . . , and (N) placing into the Nth compartment of the transportable container the group of mail for the Nth delivery point on the carrier's route.

Figure 2:
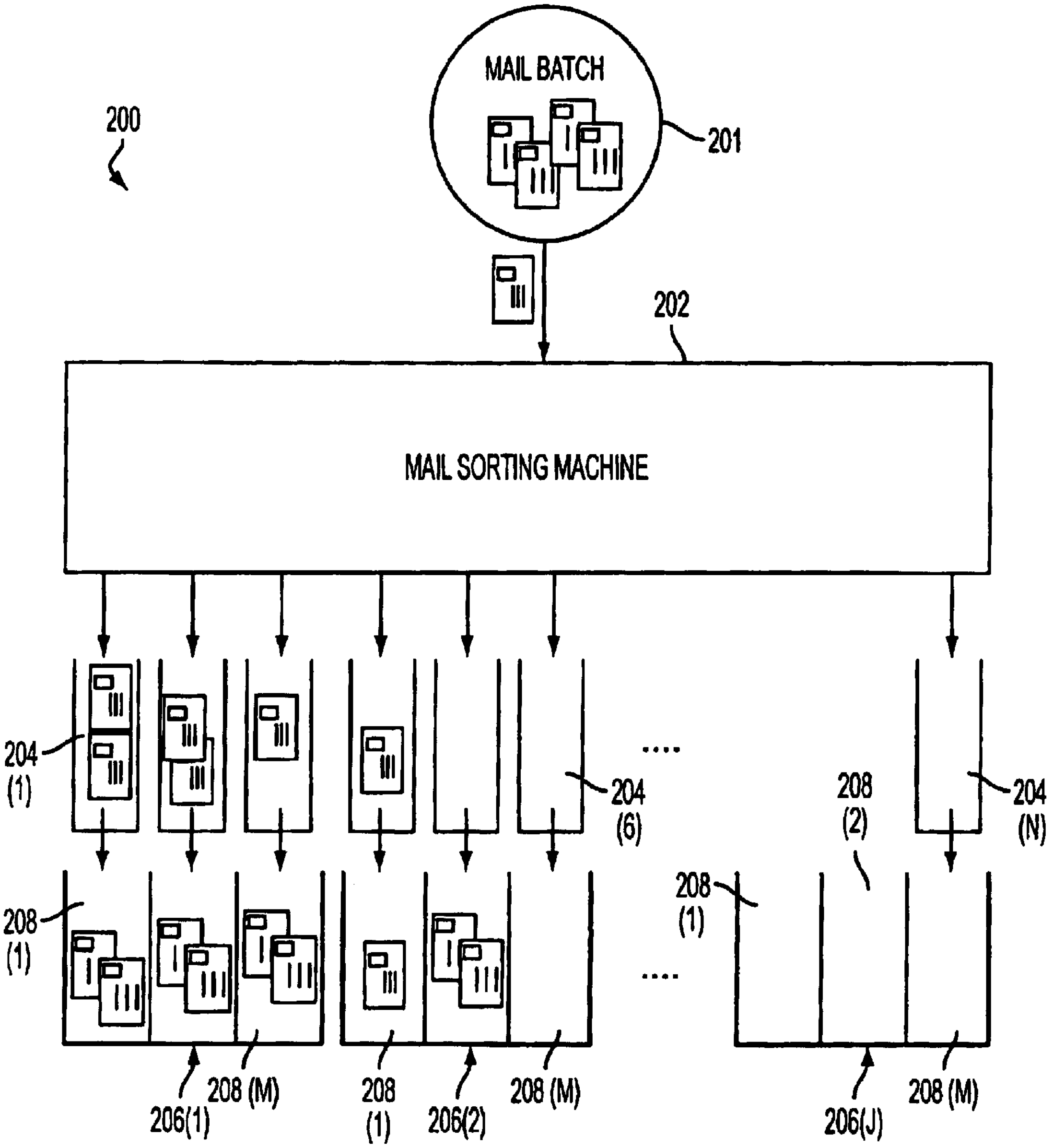
FIG. 2 is a functional block diagram of a mail sorting system according to an embodiment of the invention.

FIG. 2 is a functional block diagram of a mail sorting system 200 according to an embodiment of the invention.

Mail sorting system 200 can be used in performing process 100. Mail sorting system 200 includes: (1) a mail sorting machine 202, (2) a set of one or more compartments 204(1)–(N) for receiving mail (e.g., letters and/or flats) processed by sorting machine 202 and for storing the mail, at least temporarily, and (3) one or more transportable containers 206(1)–(J) for storing and transporting the mail. Each container 206 may have one or more compartments 208(1)–(M). Mail sorting machine 200 may be a conventional mail sorting apparatus.

Figure 3:
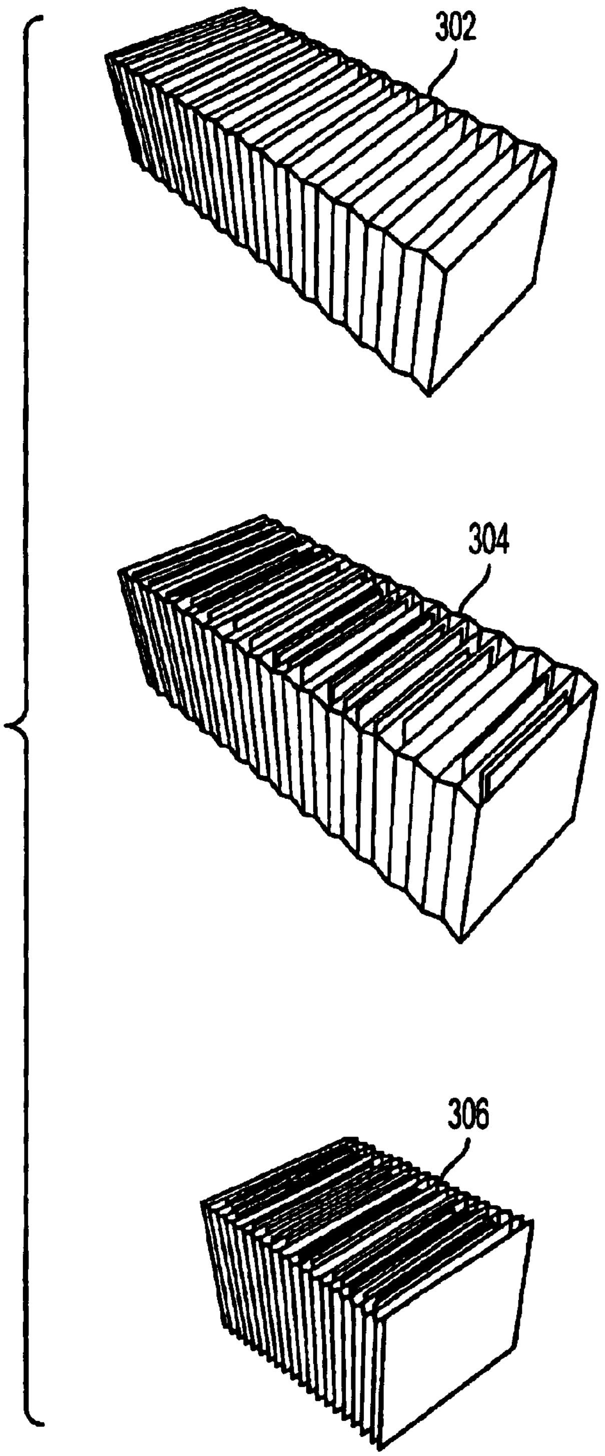
FIG. 3 illustrates example flexible/expandable containers.

Preferably, container 206 is flexible and/or expandable, like an accordion file, whereas compartments 204 are rigid. In embodiments where container 206 is flexible and/or expandable, container 206 may be constructed from paper and/or plastic products. Additionally, it is preferred that container 206 be detachably connected to compartments 204 so that container 206 can be used to transport mail from one point to another. FIG. 3 illustrates example flexible/expandable containers 302–306 that may be used as container 206 of system 200.

Figure 4:
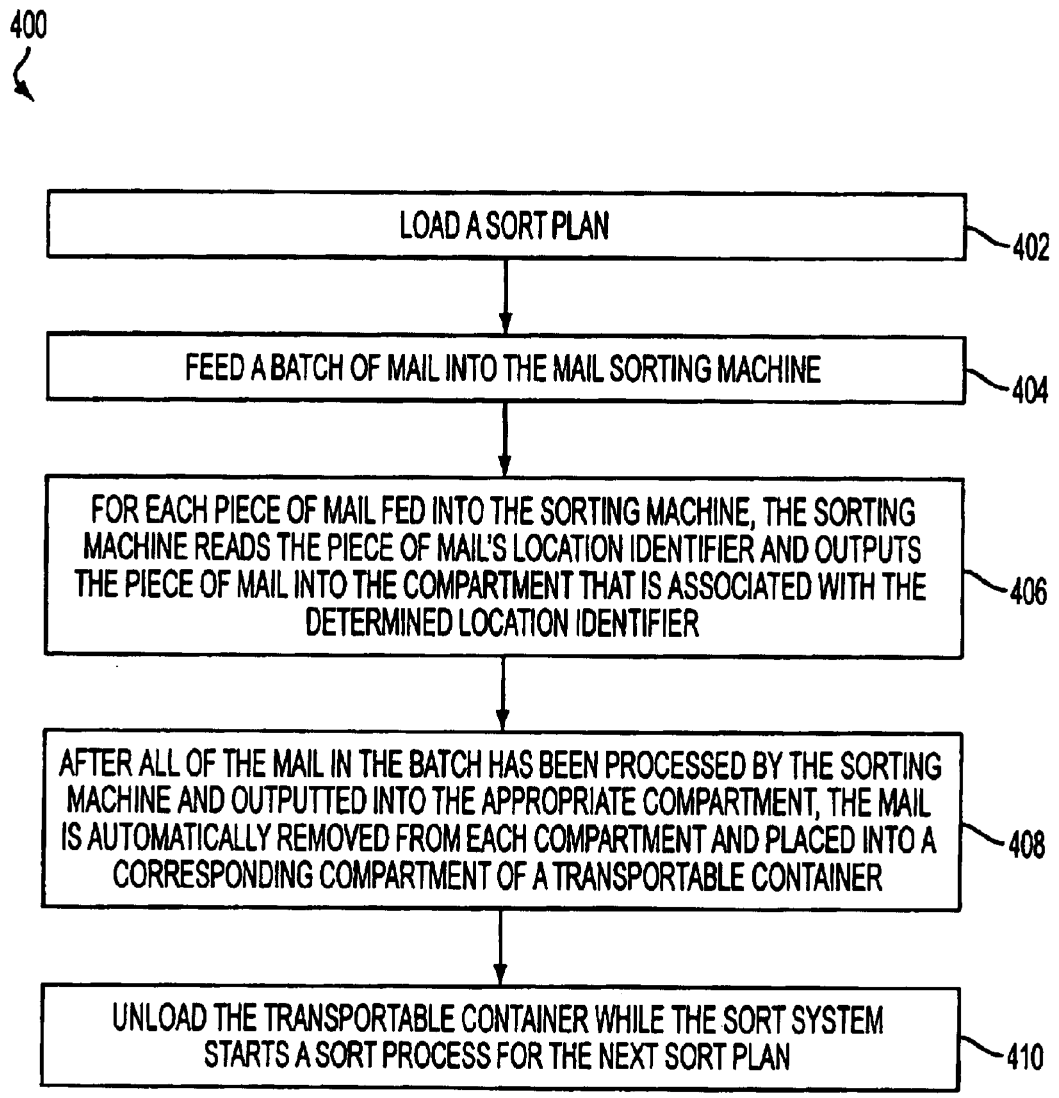
FIG. 4 is a flow chart illustrating a process, according to one embodiment, for sorting mail.

FIG. 4 is a flow chart illustrating a process 400, according to one embodiment, for sorting mail using system 200. In step 402, a sort plan is loaded into system 200. The sort plan associates each compartment 204 with one or more location identifiers. A location identifier may be, for example, a postal code (e.g., a zip code), a street address, a combination of a postal code and street address, etc.

In step 404, a batch of mail 201 is fed into mail sorting machine 202. Each piece of mail in batch 201 should have a location identifier. The location identifier is usually printed on the piece of mail or printed on a label that is attached to the piece of mail.

In step 406, for each piece of mail fed into sorting machine 202, sorting machine 202 reads the piece of mail's location identifier and outputs the piece of mail into the compartment 204 that is associated with the determined location identifier. After all of the mail in the batch 201 has been processed by sorting machine 202 and outputted into the appropriate compartment 204, the mail is removed from each compartment 204 and placed into a corresponding compartment 208 of a transportable container 206 (step 408). For example, the mail stored in compartment 204(1) may be automatically transferred into the corresponding compartment 208(1) of container 206(1).

Next (step 410), transportable containers 206, which are now filled with sorted mail, are unloaded so that they may be moved from their current location to a new location. For example, if the mail stored in a container 206 needs to be further processed, the container may be transported to a place where the mail can be further processed. This can be done while system 200 starts sorting a new batch of mail according to the next sort plan.

Figure 5:
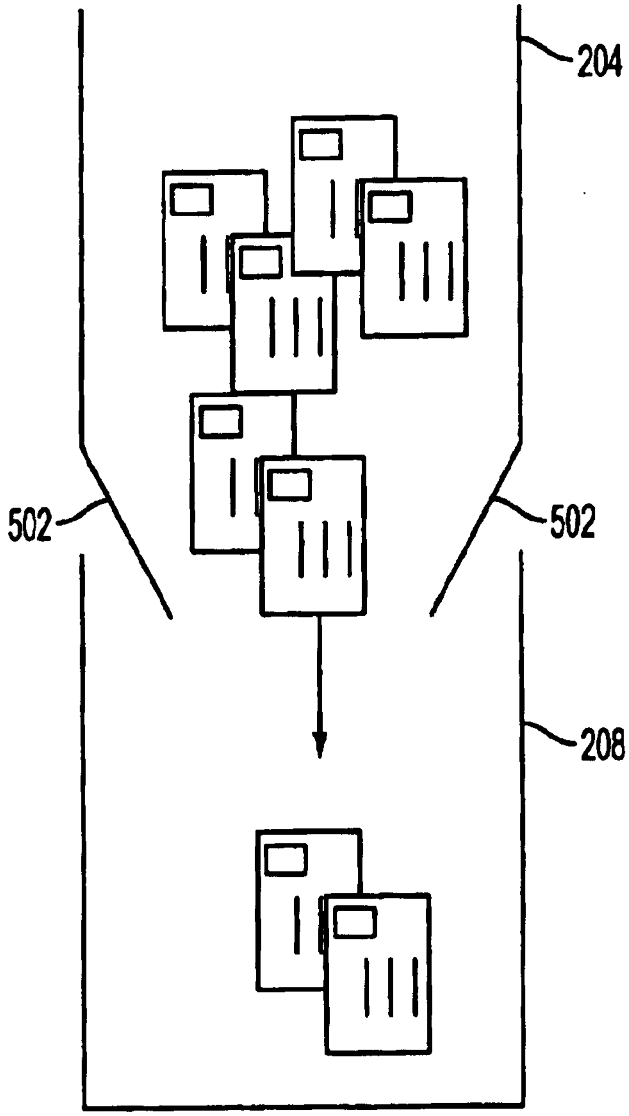
FIG. 5 illustrates an embodiment of a compartment of a container for holding mail.

In some embodiments, each compartment 204 has a mechanism for automatically emptying the contents of the compartment 204 into the corresponding compartment 208. For example, in embodiments where each compartment 204 is located above its corresponding compartment 208, the floor of each compartment 204 may be configured to open upon receiving a signal from a controller of system 200. This feature is illustrated in FIG. 5. As shown in FIG. 5, each compartment 204 may be configured with, for example, a hinged floor 502 that can be opened to dump the mail into the corresponding compartments 208 upon a controller (not shown) sending a signal to, for example, a solenoid (not shown) for opening the hinged floor 502.

Figure 6:
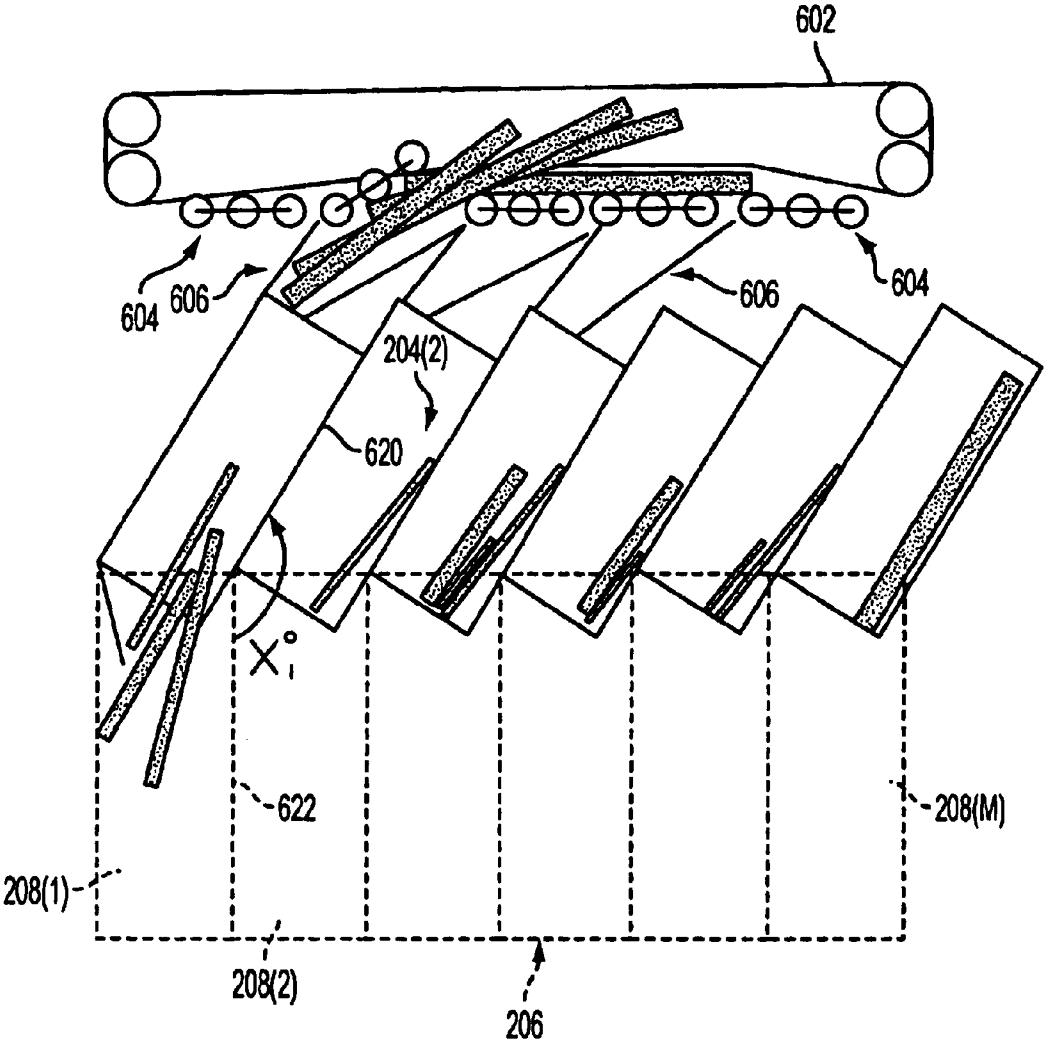
FIG. 6 illustrates a sorting machine according to one embodiment.

FIG. 6 illustrates an embodiment of sorting machine 202. As shown in FIG. 6, mail sorting machine 202 may include: a conveyer belt 602 for moving mail through the machine, roller diverters 604 for routing mail to the appropriate compartment 204, and chutes 606 that provide a path between machine 202 and compartments 204. Roller diverters 604 may be controlled by a controller (not shown). The controller determines the location code associated with each piece of mail and activates the appropriate roller diverter 604 at the appropriate time so that the mail piece is routed to the compartment 204 that is associated with the location code of the mail piece according to the sort plan.

As further shown in FIG. 6, each compartment 204 may be angled with respect its corresponding compartment 208. For example, the angle X between a side wall 620 of a compartment 204(*i*) and a corresponding side wall 622 of corresponding compartment 208(*i*) is greater than 90 degrees but less than 180 degrees. The angle should be an angle that allows mail to enter easily and is such that friction does not interfere with output to the corresponding compartment. In some embodiments, the angle is between 90 degrees and 135 degrees.

It should be understood that FIG. 6 is included herein to illustrate an example mail sorting device that can be used in the present invention. But, as discussed above, any conventional mail sorting machine may be used.

Figure 7:
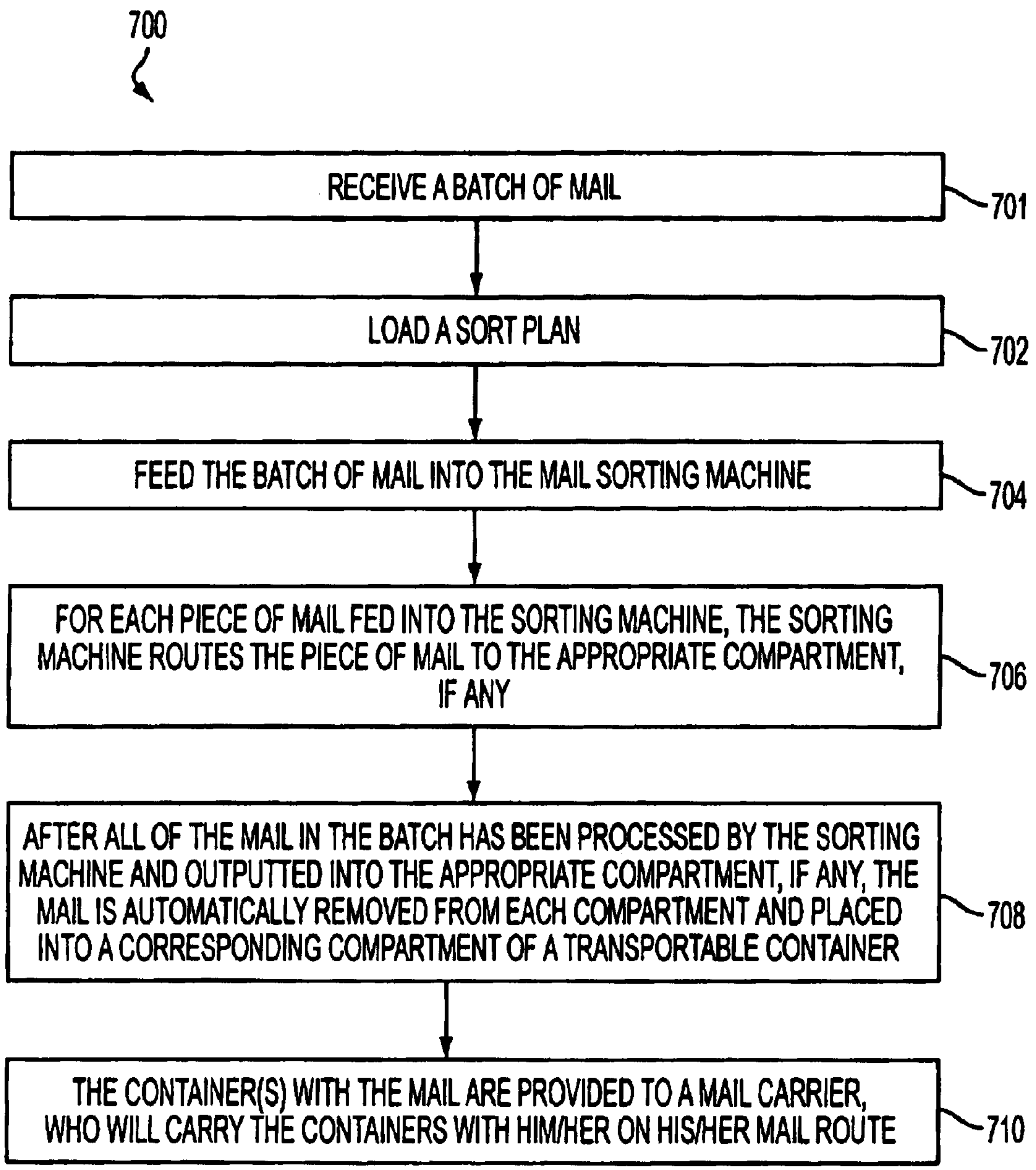
FIG. 7 is a flow chart illustrating a process, according to an embodiment, for providing a mail carrier with a container of mail, wherein the mail is arranged in order by the carrier's delivery points and separated by delivery point.

FIG. 7 is a flow chart illustrating a process 700, according to an embodiment of the invention, of using system 200 for providing a mail carrier 802 (see FIG. 8) with a batch of mail 804 arranged in order by the carrier's delivery points and separated by delivery point. This process relieves the mail carrier 802 from having to manually separate the mail by delivery point prior to delivery.

In step 701, a batch of mail is received. At least some of the mail in this batch is addressed to a delivery point on mail carrier 802's route. In step 702, a sort plan is created. The sort plan associates each of one or more delivery points on carrier 802's route with a compartment 204.

For example, if carrier 802's route includes 20 delivery points, but system 200 includes only 3 compartments 204 (1)–(3), then the first time process 700 is performed the first delivery point on the route may be associated with compartment 204(1), the second delivery point on the route may be associated with compartment 204(2), and the third delivery point on the route may be associated with compartment 204(3). If, however, the number of compartments 204 exceeds the number of delivery points, then each delivery point on the route can be associated with one compartment 204. Preferably, if there are j delivery points, then compartments 204(1)–(j) are associated with delivery points(1)–(j), respectively. In this way, compartment 204(1) is associated with the first delivery point on the route, compartment 204(2) is associated with the second delivery point on the route and so on such that the mail for the route will be physically arranged according to the delivery point sequence.

In step 704, the batch of mail is fed into a mail sorting machine 202. In step 706, for each piece of mail fed into sorting machine 202, sorting machine 202 routes the piece of mail to the appropriate compartment 204, if any. For example, if a piece of mail input into sorting machine 202 is addressed to a delivery point on carrier 802's route, then sorting machine may use bar code and/or optical character recognition and/or another technology to determine the delivery point to which the piece of mail is addressed and then route the piece of mail into the compartment 204 that is associated with the determined delivery point.

After all of the mail in the batch has been processed by sorting machine 202 and outputted into the appropriate compartment 204, if any, the mail is removed from each compartment 204 and placed into a corresponding compartment 208 of one or more containers 206 (step 708). Consequently, each compartment 208 will hold mail that is addressed to only one particular delivery point. That is, all of the mail in the batch that is addressed to a particular delivery point will be stored in the same compartment 208. Thus, process 700 separates the mail by delivery point.

Figure 8:
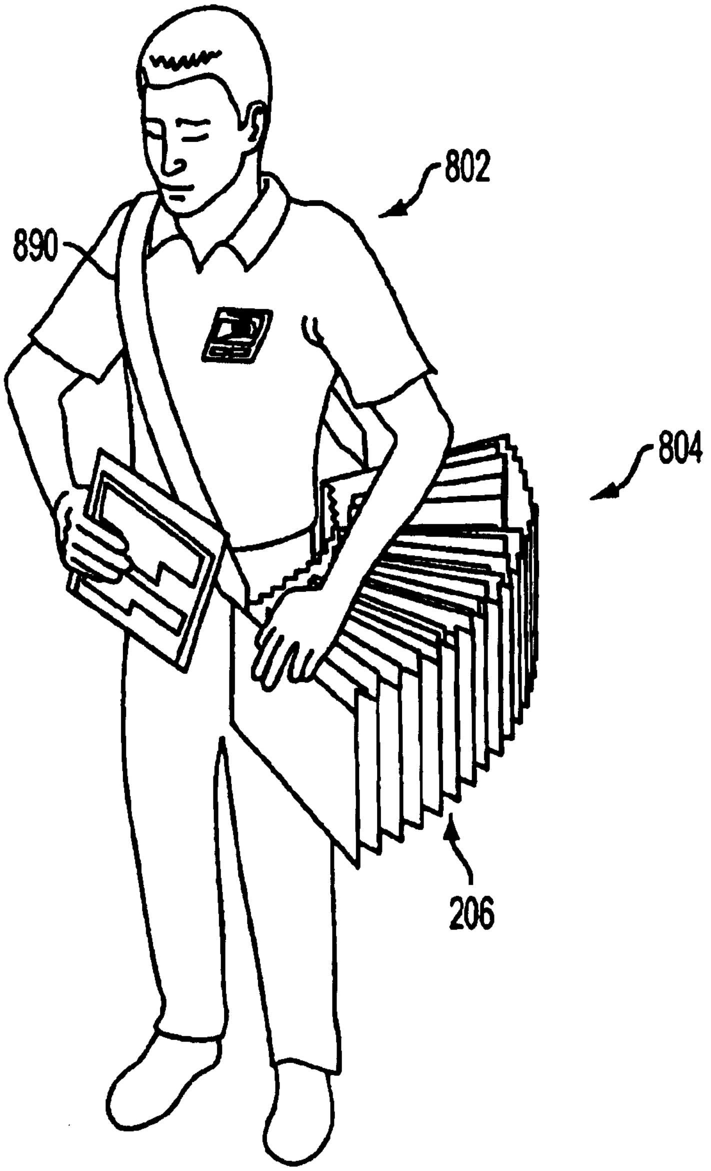
FIG. 8 is an illustration of a mail carrier transporting a container according to an embodiment of the present invention.

Next (step 710), container(s) 206, which is now filled with mail addressed to the delivery points on carrier 802's route and which is transportable, may be carried along the route by carrier 802. FIG. 8 illustrates carrier transporting a container 206. As shown in FIG. 8, a shoulder strap 890 may be attached to container 206 to facilitate the carrier's ability to transport the container. As is also shown in FIG. 8, container 206 may be flexible so that container 206 can curve around the carrier's body, as is shown in the figure.

As discussed, process 700 not only provides a transportable container holding the mail for carrier 802's route, but also, as is evident by the above description of process 700, provides the mail so that it is arranged in order by delivery point as well as being separated by delivery point. Moreover, the invention accomplishes this without using environmentally unfriendly packaging. Accordingly, the present invention relieves the mail carrier from having to manually separate the mail by delivery point and does so in a way that is environmentally friendly. Other advantages also exist.

While the processes described herein have been illustrated as a series or sequence of steps, the steps need not necessarily be performed in the order described, unless indicated otherwise.

Further, while various embodiments/variations of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of using a mail sorting machine to provide a transportable container containing mail that is arranged in delivery point order and separated by delivery point, wherein the mail sorting machine is capable of routing each piece of mail input therein to one of a plurality of temporary storage compartments, and wherein the transportable container includes a plurality of compartments, with each compartment of the transportable container being associated with only one of the plurality of temporary storage compartments, the method comprising:

receiving a plurality of mail pieces, wherein each mail piece in said plurality of mail pieces is addressed to a delivery point on a mail carrier's route;

associating, during a mail sorting process, each one of the plurality of temporary storage compartments with only one delivery point on the mail carrier's route such that during the mail sorting process no two temporary storage compartments of the plurality are associated with the same delivery point;

for each mail piece in the plurality of mail pieces, determining the delivery point to which the mail piece is addressed and storing the mail piece in the temporary storage compartment associated with the determined delivery point; and for each said temporary storage compartment, removing the mail pieces stored in said temporary storage compartment by transferring said mail pieces to the compartment of the transportable container with which said temporary storage compartment is associated.

2. The method of claim 1, further comprising the step of providing the transportable container to the mail carrier.

3. The method of claim 2, further comprising the step of attaching a shoulder strap to the transportable container, thereby providing a strap that makes it easier for the mail carrier to carry the transportable container.

4. The method of claim 1, wherein the transportable container is expandable.

5. The method of claim 4, wherein the expandable container is an accordion file.

6. The method of claim 1, further comprising the step of positioning the transportable container underneath the plurality of temporary storage compartments prior to transferring the mail from the temporary storage compartments to the transportable container.

7. The method of claim 6, wherein the transferring step comprises the step of opening the bottom of each temporary storage compartment.

8. A method for delivering mail, comprising:

using a mail sorting machine to create N batches of mail, wherein each one of the N batches of mail needs to be delivered to a different delivery point, wherein N is greater than 1;

providing a temporary storage unit comprising N temporary storage compartments, wherein each one of the N batches of mail is temporarily stored in one of the N temporary storage compartments, and wherein no two of the N batches of mail are stored in the same temporary storage compartment;

providing a transportable container having N or more compartments;

for each batch of mail stored in one of said temporary storage compartments, automatically removing the batch of mail from the temporary storage compartment and placing the batch of mail into a compartment of the transportable container such that no two of the N batches of mail are placed into the same compartment of the transportable container; and storing each of the N batches of mail in a temporary storage compartment prior to automatically placing the batches into the compartments of the transportable container, wherein no two of the N batches of mail are stored in the same temporary storage compartment;

providing the transportable container to a mail carrier, wherein the mail carrier carries the transportable container while delivering mail to delivery points on a mail route.

9. The method of claim 8, wherein the step of automatically placing a batch of mail into a compartment of the transportable container comprises the step of automatically transferring the contents of one of the temporary storage compartments into one of the compartments of the transportable container.

10. The method of claim 8, wherein each compartment of the transportable container is expandable.

11. The method of claim 10, wherein the transportable container is an accordion file.

12. The method of claim 9, further comprising the step of positioning said one of the compartments of the transportable container underneath a floor of said one of the temporary storage compartments prior to transferring the contents of said one of the temporary storage compartments into said one of the compartments of the transportable container.

13. The method of claim 12, wherein, prior to the step of automatically transferring the contents of said one of the temporary storage compartments into one of the compartments of the transportable container, the method comprises the step of automatically opening the floor of said one of the temporary storage compartments.

14. A mail sorting system, comprising:

a mail sorter that sorts mail;

a plurality of temporary storage compartments, each of said plurality of temporary storage compartments being able to receive and store mail that has been sorted by the mail sorter; and a transportable, expandable container, the transportable, expandable container comprising a plurality of expandable compartments, wherein each said expandable compartment is associated with one of the plurality of temporary storage compartments such that no two of said expandable compartments is associated with the same temporary storage compartment.

15. The mail sorting system of claim 14, wherein the expandable container is flexible.

16. The mail sorting system of claim 14, wherein, during a mail sorting process, each one of the plurality of temporary storage compartments is associated with only one delivery point on the mail carrier's route such that during the mail sorting process no two temporary storage compartments of the plurality are associated with the same delivery point.

17. The mail sorting system of claim 14, wherein an opening of each said expandable compartment is positioned underneath one of the temporary storage compartments.

18. The mail sorting system of claim 17, wherein an angle between a side wall of a temporary storage compartment and a corresponding side wall of the expandable compartment that is associated with said temporary storage compartment is greater than 90 degrees but less than about 135 degrees.

19. The mail sorting system of claim 18, wherein each of said temporary storage compartments has an openable floor.

20. The mail sorting system of claim 19, wherein the openable floor is a hinged floor.

21. A method of using a mail sorting machine to provide a transportable container containing mail that is arranged in delivery point order and separated by delivery point, wherein the mail sorting machine is capable of routing each piece of mail input therein to one of a plurality of temporary storage compartments, and wherein the transportable container includes a plurality of compartments, with each compartment of the transportable container being associated with one of the plurality of temporary storage compartments, the method comprising:

receiving a plurality of mail pieces, wherein each mail piece in said plurality of mail pieces is addressed to a delivery point on a mail carrier's route;

associating each one of the plurality of temporary storage compartments with a delivery point on the mail carrier's route such that no two temporary storage compartments of the plurality are associated with the same delivery point;

for each mail piece in the plurality of mail pieces, determining the delivery point to which the mail piece is addressed and storing the mail piece in the temporary storage compartment associated with the determined delivery point;

for each said temporary storage compartment, transferring the mail pieces stored in said temporary storage compartment to the compartment of the transportable container with which said temporary, storage compartment is associated; and positioning the transportable container underneath the plurality of temporary storage compartments prior to transferring the mail from the temporary storage compartments to the transportable container.

22. The method of claim 21, wherein the transferring step comprises the step of opening the bottom of each temporary storage compartment.

23. A mail sorting system, comprising:

a mail sorter that sorts mail;

a plurality of temporary storage compartments, each of said plurality of temporary storage compartments being able to receive and store mail that has been sorted by the mail sorter; and a transportable, expandable container, the transportable, expandable container comprising a plurality of expandable compartments, wherein each said expandable compartment is associated with one of the plurality of temporary storage compartments such that no two of said expandable compartments is associated with the same temporary storage compartment, and an opening of each said expandable compartment is positioned underneath one of the temporary storage compartments.

24. The mail sorting system of claim 23, wherein an angle between a side wall of a temporary storage compartment and a corresponding side wall of the expandable compartment that is associated with said temporary storage compartment is greater than 90 degrees but less than about 135 degrees.

25. The mail sorting system of claim 24, wherein each of said temporary storage compartments has an openable floor.

26. The mail sorting system of claim 25, wherein the openable floor is a hinged floor.

* * * * *